(12) United States Patent
Bavar et al.

(10) Patent No.: US 10,438,493 B2
(45) Date of Patent: Oct. 8, 2019

(54) HYBRID TRIP PLANNING FOR AUTONOMOUS VEHICLES

(71) Applicant: Uber Technologies, Inc., San Francisco, CA (US)

(72) Inventors: Brett Bavar, Pittsburgh, PA (US); Emily Bartel, Pittsburgh, PA (US); Xiaodong Zhang, Pittsburgh, PA (US); Molly Nix, Pittsburgh, PA (US); Matthew Sweeney, Pittsburgh, PA (US); Bryan Nagy, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 210 days.

(21) Appl. No.: 15/450,268

(22) Filed: Mar. 6, 2017

(65) Prior Publication Data

US 2018/0061242 A1    Mar. 1, 2018

Related U.S. Application Data

(60) Provisional application No. 62/379,162, filed on Aug. 24, 2016.

(51) Int. Cl.
*G08G 1/00* (2006.01)
*G01C 21/34* (2006.01)
(Continued)

(52) U.S. Cl.
CPC ........... *G08G 1/202* (2013.01); *B60W 50/082* (2013.01); *G01C 21/3407* (2013.01);
(Continued)

(58) Field of Classification Search
None
See application file for complete search history.

(56) References Cited

U.S. PATENT DOCUMENTS 8,521,352 B1 *  8/2013  Ferguson ............. G05D 1/0274
                                                         701/25
8,676,430 B1     3/2014  Ferguson et al.
(Continued)

FOREIGN PATENT DOCUMENTS

EP    3032458     6/2016
RU    132393      9/2013
(Continued)

OTHER PUBLICATIONS

ISR in PCT/US2017/040532 dated Jan. 11, 2018.
ISR and Written Opinion in PCT/US2017/056277 dated Apr. 5, 2018.
ISR and WO in PCT/US2017/046796 dated Feb. 28, 2018.

*Primary Examiner* — Thomas G Black
*Assistant Examiner* — Demetra R Smith-Stewart
(74) *Attorney, Agent, or Firm* — Mahamedi IP Law LLP

(57) ABSTRACT

A hybrid trip planning system can receive transport requests from requesting users, determine pick-up and/or drop off locations from the transport request, and select available autonomous vehicles (AV) to service the transport requests. For each transport request, the planning system can identify a plurality of entry points from the pick-up location to an autonomy grid on which the AVs operate, and a plurality of exit points from the autonomy grid to the drop-off location. The planning system may determine optimal entry and/or exit points and transmit transport data to the selected AV. The transport data can provide optimal routing for a human safety driver to drive the selected AV in manual segments that are off grid, and switch the AV into an autonomous driving mode within the autonomy grid.

20 Claims, 10 Drawing Sheets

(51) Int. Cl.
  *B60W 50/08* (2012.01)
  *G06Q 10/04* (2012.01)
  *G01S 19/13* (2010.01)

(52) U.S. Cl.
  CPC ....... *G06Q 10/04* (2013.01); *B60W 2550/402* (2013.01); *G01S 19/13* (2013.01)

(56) References Cited

U.S. PATENT DOCUMENTS

| | | |
|---|---|---|
| 8,825,265 B1 | 9/2014 | Ferguson et al. |
| 9,140,792 B2 | 9/2015 | Zeng |
| 9,260,244 B1 * | 2/2016 | Cohn .................. G05D 1/0297 |
| 9,459,625 B1 | 10/2016 | Ferguson |
| 9,494,439 B1 * | 11/2016 | Ross .................. B60W 50/029 |
| 9,631,933 B1 * | 4/2017 | Aula ...................... E05F 15/70 |
| 9,739,881 B1 | 8/2017 | Pavek |
| 9,841,763 B1 | 12/2017 | Valois |
| 9,902,403 B2 | 2/2018 | Donnelly |
| 9,904,375 B1 | 2/2018 | Donnelly |
| 2008/0033645 A1 | 2/2008 | Levinson |
| 2010/0262359 A1 | 10/2010 | Motoyama |
| 2012/0296539 A1 | 11/2012 | Cooprider |
| 2012/0310516 A1 | 12/2012 | Zheng |
| 2013/0060461 A1 | 3/2013 | Wong |
| 2013/0117321 A1 | 5/2013 | Fischer |
| 2014/0046585 A1 | 2/2014 | Morris, IV |
| 2015/0369617 A1 | 12/2015 | Ding |
| 2016/0054135 A1 | 2/2016 | Fowe |
| 2016/0125608 A1 | 5/2016 | Sorstedt |
| 2016/0167582 A1 | 6/2016 | Chen |
| 2016/0349063 A1 | 12/2016 | Maurer |
| 2017/0008521 A1 | 1/2017 | Braunstein |
| 2017/0023659 A1 | 1/2017 | Bruemmer |
| 2017/0193826 A1 * | 7/2017 | Marueli ................. G08G 1/202 |
| 2017/0227647 A1 | 8/2017 | Baik |
| 2017/0309172 A1 | 10/2017 | Linder |
| 2017/0315229 A1 | 11/2017 | Pavek |
| 2017/0316696 A1 * | 11/2017 | Bartel .................... G08G 1/202 |
| 2018/0060778 A1 * | 3/2018 | Guo ...................... G01C 21/343 |
| 2018/0061242 A1 | 3/2018 | Bavar |
| 2018/0143639 A1 | 5/2018 | Singhal |

FOREIGN PATENT DOCUMENTS

| | | |
|---|---|---|
| WO | WO 2011055978 | 5/2011 |
| WO | WO 2014/147361 | 9/2014 |

* cited by examiner

HYBRID TRIP PLANNING FOR AUTONOMOUS VEHICLES

CROSS REFERENCE TO RELATED APPLICATION

The application claims the benefit of U.S. Provisional Application No. 62/379,162, entitled "HYBRID AUTONOMY ROUTING," filed on Aug. 24, 2016; the foregoing application being hereby incorporated by reference in its entirety.

BACKGROUND

Precision, highly detailed mapping offers many advantages in autonomous vehicle (AV) operations. This can involve recording, processing, and labeling ground truth data (e.g., image and/or LIDAR data), and providing the resultant localization maps for on-board storage for dynamic comparison by the AV's processing systems with a live sensor view of the AV's surroundings. Such detailed mapping can be time, labor, and cost intensive, and can further act as a limiting factor in the eventual ubiquity of AV operations on public roads and highways.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
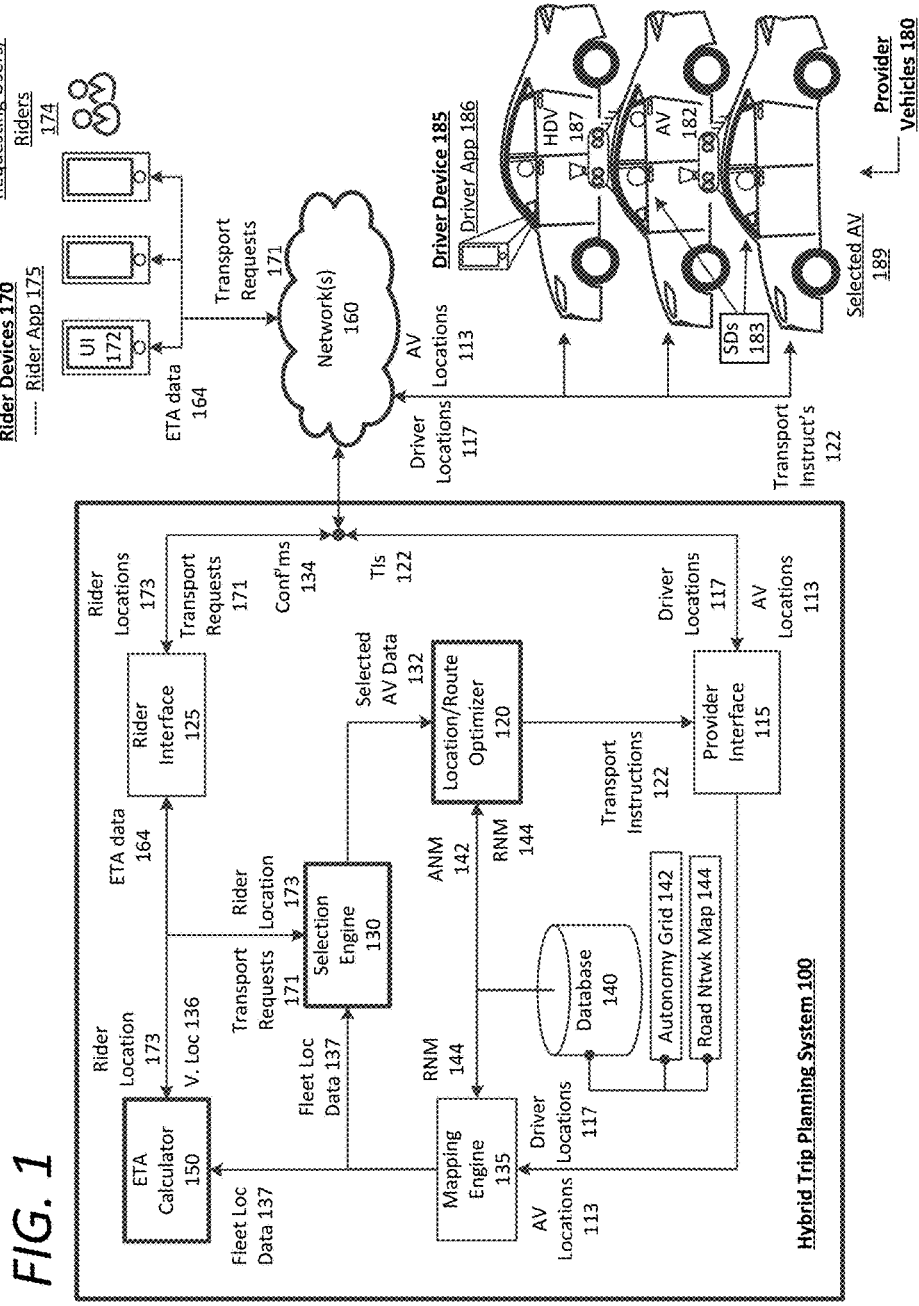
FIG. 1 is a block diagram illustrating an example hybrid trip planning system, according to examples described herein.

A backend, hybrid trip planning system is disclosed herein, and can provide a balance between human-driven, manual control of an autonomous vehicle (AV), and autonomous control of the AV throughout a given region. Such hybrid trip planning can be necessary for areas in which an autonomy grid map only partially covers the given region. As provided herein, the autonomy grid map can comprise a high level map illustrating road networks on which highly detailed localization mapping has been performed. A localization map production team can label and produce localization sub maps for each road segment of the autonomy grid map, with each sub map including inserted metadata identifying lane geometry, road rules, logical links between the sub maps, background subtraction, and the like. These localization sub maps can be stored on-board AVs operating on the autonomy grid map to perform continuous localization and pose operations, compare each respective sub map to live sensor view generated by a sensor suite on the AV to perform perception and prediction operations, and modulate acceleration, braking, steering, and other control inputs on AV for autonomous operation.

In various implementations, the hybrid trip planning system can receive transport requests from requesting users in connection with an on-demand transportation service. In some aspects, the hybrid trip planning system can manage both human drivers as well as autonomous capable vehicles providing transportation services for requesting users of the on-demand transportation service. In doing so, the hybrid trip planning system can select AVs to service transport requests in accordance with the set of criteria, such as minimum thresholds for autonomous mode operation, and/or maximum thresholds for manual mode driving by a safety driver. As such, the hybrid trip planning system distinguishes between purely human driven vehicles and autonomous capable vehicles with a human safety driver. It is to be presumed herein that each AV operating within the given region includes a human safety driver that can take over manual control of the AV during emergencies or off-grid operation.

For each received transport request, the hybrid trip planning system can determine a set of candidate vehicles that are within a predetermined proximity or time from a pickup location identified in the transport request. Additionally or alternatively, the hybrid trip planning system can determine whether the transport request satisfies the set of criteria for the on-demand AV service. For transport requests in which the pickup location and drop off location are within the autonomy grid map, the hybrid trip planning system can instruct and AV to operate in an autonomous mode to rendezvous with the requesting user at the pickup location and transport the requesting user to the drop off location without manual control by the human safety driver. For transport requests in which all viable routes between the pickup location and drop off location are outside the autonomy grid map, hybrid trip planning system can invite a proximate human driver to rendezvous with the requesting user and service the transport request.

However, certain transport requests involve pickup locations and drop off locations that have routes therebetween (e.g., most optimal routes in terms of distance and/or time) with substantial segments along the roads of the autonomy grid map. These transport requests allow for autonomy along portions of the route, while manual operation is required along portions external to the autonomy grid map. For example, the pickup location indicated the transport request may be close to the autonomy grid map, but may still require some manual control of the AV to get from the pickup location to the autonomy grid map. Likewise, the drop off location may require manual exit from the autonomy grid map, and then manual control of the AV to the drop off location. As provided herein, such examples can comprise hybrid routes involving both manual and autonomous control modes on AV.

For such hybrid trips, in determining a most optimal overall route from a pickup location to drop off location, hybrid trip planning system can perform a set of optimizations to determine a most optimal entry point into the autonomy grid map, a most optimal route from the pickup location to the entry point, most optimal exit point from the autonomy grid map, a most optimal route from the exit point to the drop off location, and/or most optimal autonomous route within the autonomy grid map from the entry point to the exit point. This set of optimizations can be performed as at least one of distance optimizations, time optimizations, risk optimizations, overall cost optimizations, fuel or power consumption optimizations, or any combination of the foregoing.

Accordingly, for certain transport requests, the hybrid trip planning system can select an AV to fulfill the request by selecting the AV from a plurality of candidate vehicles, which can comprise human driven vehicles as well as other AVs. If the pickup location is outside of the autonomy grid map, hybrid trip planning system can identify a plurality of entry points from the pick-up location to the autonomy grid map, and determine a most optimal entry point from the plurality of entry points. As described herein, the most optimal entry point can be determined based on any number of factors, such as a distance optimization from the pickup location to the autonomy grid map, an overall distance optimization for the trip (e.g., using a road network map), or a time optimization from the pickup location to the autonomy grid map or the overall trip (e.g., using a live traffic map).

The hybrid trip planning system can also determine a first optimal route from the pickup location to the most optimal entry point. In some aspects, the hybrid trip planning system can determine first optimal route prior to determining the most optimal entry point, and base the decision of determining the most optimal entry point based on the first optimal route. If the drop off location is within the autonomy grid map, then the hybrid trip planning system can transmit transport data to the selected AV, where the transport data provides the first optimal route for the human safety driver to drive the AV in a manual mode from the pick-up location to the most optimal entry point. From there, the AV can switch from the manual mode to the autonomous mode. For example, the safety driver can actively switch the AV to autonomous mode via an input mechanism within the passenger interior the AV.

In various examples, hybrid trip planning system can identify that the drop off location is external to the autonomy grid map, and can determine a plurality of potential exit points from the autonomy grid map to the drop off location. In such examples, hybrid trip planning system can also determine the most optimal exit point from the autonomy grid map to the drop off location. As described herein, the most optimal exit point can be determined based on time or distance optimizations of the overall trip or from the exit point to the drop off location. Furthermore, upon reaching the exit point, the AV can switch from the autonomous mode back to the manual mode to enable this human safety driver to conclude the trip. Accordingly, the transport data transmitted to the AV can also include data indicating the second optimal route from the most optimal exit point to the drop off location. In such implementations, the transport data can be executable by the AV to cause mapping and routing information to be generated on an interior user interface of the AV. The mapping and routing information can provide the human safety driver with the first optimal route from the pick-up location to the most optimal entry point, and the second optimal route from the most optimal exit point to the drop off location.

In some aspects, the route within the autonomy grid map can be determined by either the hybrid trip planning system or by the AV itself. In the former case, hybrid trip planning system can perform overall route optimization to determine each of most optimal entry point, the autonomy route within the autonomy grid map, and most optimal exit point—as well as the first optimal route from the pickup location to most optimal entry point and the second optimal route from most optimal exit point to the drop off location. Accordingly, transport data transmitted to the AV can further include route date executable by control system of the AV to follow the determined autonomy route within the autonomy grid map.

In certain implementations, the human safety driver may diverge from the given routes corresponding to the most optimal entry point and the most optimal exit point. For example, safety driver may operate AV in manual mode from the pickup location to an alternative entry point. In such examples, diverging from the given route, or entering the autonomy grid map from an alternative entry point, can trigger the hybrid trip planning system to perform additional optimizations to update any one or more of the entry point, the autonomy route, the exit point, the route to the entry point, and/or the route from the exit point to the drop off location. Thereafter, the hybrid trip planning system can transmit updated transport instructions to the AV indicating the updated entry and/or exit points, and respective routes.

As a rule, the hybrid trip planning system can set or otherwise establish each of the entry and exit points to be located after the AV has passed through a particular intersection. This can facilitate safe and even seamless transitions between the manual mode and the autonomy mode. Furthermore, it is contemplated that one or more processes described herein with respect to the hybrid trip planning system may be performed by the AV. For example, upon being selected to service a transport request, the AV may be provided with a pick-up location and destination, and may store a road network map and autonomy grid map on-board. The AV may then perform the entry point and exit point optimizations (e.g., based on the overall route between the pick-up location and destination, or segmented into multiple optimized routes), and can generate indications or prompts on an on-board display for the safety driver to manually operate the AV off-grid, and to transition the AV between manual and autonomy mode at the optimal locations.

Among other benefits, the examples described herein achieve a technical effect of facilitating the transition from AVs operating on current, limited autonomy grid maps to the eventual fully mapped cities and regions in which manual operation is no longer needed. Because extensive time, labor, and monetary resources are currently required to fully map a given area, such hybrid planning and routing is beneficial in both testing and bolstering the robustness of AV systems. Accordingly, the road networks of metropolitan areas can be analyzed to determine the most efficient or effective autonomy plan, and autonomy grid maps can be constructed and distributed to AVs, leveraging hybrid routing until the entire road network is fully mapped for autonomous capabilities.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the term "autonomous vehicle" (AV) describes any vehicle operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as on highways. More advanced AVs, such as those described herein, can operate in a variety of traffic environments without any human assistance. Accordingly, an "AV control system" can process sensor data from the AV's sensor array, and modulate acceleration, steering, and braking inputs to safely drive the AV along a given route.

System Description

FIG. 1 is a block diagram illustrating an example hybrid trip planning system, according to examples described herein. Hybrid trip planning system 100 can communicate, over one or more networks 160, with requesting users or riders 174 throughout a given region where on-demand transportation services are provided. Specifically, each requesting user 174 can execute a rider application 175 on the user's 174 computing device 170. As provided herein, the rider's computing device 170 can comprise a mobile computing device, personal computer, tablet computing device, virtual reality (VR) or augmented reality (AR) headset, and the like. Execution of the rider application 175 can cause the rider device 170 to establish a connection over the one or more networks 160 with a rider interface 125 of the hybrid trip planning system 100.

In various aspects, the executing rider application 175 can cause a user interface 172 to be generated on a display screen of the rider device 170. Using the user interface 172, the requesting user 174 can generate and transmit a transport request 171 to the rider interface 125. In various examples, the hybrid trip planning system 100 can further include a selection engine 130 that ultimately selects either a driver of human-driven vehicle 187 or an AV 189 to service the transport request 171.

According to examples, the hybrid trip planning system 100 can include a provider interface 115 that connects, via the one or more networks 160, with a fleet of provider vehicles 180 available to provide on-demand transportation services to the requesting users 174. In various examples, the provider vehicles 180 can comprise a fleet of AVs, any number of drivers, and/or a blend of human-driven vehicles and AVs servicing a given region. As provided herein, the given region can include a partial autonomy mapped road network on which AVs can operate while the entirety of the given region may be serviced by human-driven vehicles 187. The hybrid trip planning system 100 can include a database 140 storing a road network map 144 detailing the entirety of the given region in which on-demand transport services are available, and an autonomy grid map 142—included in the region's road network—in which AVs can operate without human control or intervention.

In certain aspects, the human-driven vehicles 187 can also operate to provide transportation services at will, where the driver can execute a driver application 186 on a driver device 185 (e.g., a mobile computing device, smart phone, tablet computing device, etc.), causing the driver device 185 to transmit location data indicating the driver's location 117 to the provider interface 115. The executing driver application 186 can enable the driver of the vehicle 187 to receive transport instructions 122 indicating a pick-up location to rendezvous with a matched requesting user 174 to service a given transport request 171.

Likewise, any given AV 182 in the fleet can transmit its AV location 113 to the provider interface 115 of the hybrid trip planning system 100. In many examples, the hybrid trip planning system 100 can also include a mapping engine 135, which can receive the AV locations 113 and driver locations 117 to provide overall fleet location data 137 to a selection engine 130. The fleet location data 137 can include the dynamic locations of each AV 182 and human-driven vehicle 187 of the available provider vehicles 180 throughout the given region. In some aspects, the mapping engine 135 can provide the fleet location data 137 in the context of the road network map 144, to enable the selection engine 130 to match available vehicles—human-driver or AV—with requesting users 174.

The selection engine 130 can receive the transport requests 171 from the rider interface 125. The transport requests 171 can include respective pickup locations of the requesting users 174. In some aspects, the selection engine can also receive rider locations 173 (e.g., from location-based resources, such as GPS data, from the rider devices 170. Utilizing the pickup location and/or the rider location 173 for a given transport request 171, the selection engine 130 can identify a set of candidate vehicles to service the transport request 171. In doing so, the selection engine 130 can identify vehicles proximate to the pickup location indicated in the transport request 171 or the rider location 173, and determine the set of candidate vehicles based on the vehicles being a predetermined distance or time from the pickup location or rider location 173.

In some aspects, the hybrid trip planning system 100 can include estimated time of arrival (ETA) calculator 150, which can receive the fleet location data 137 from the on mapping engine 135. The ETA calculator 150 can utilize the fleet location data 137 to provide ETA data 164 to the rider devices 170 over the one or more networks 160. In doing so, the mapping engine 135 can generate live traffic data along with the fleet location data 137 to estimate an arrival time for a designated vehicle (e.g., a closest available vehicle or AV) to the current location 173 of the requesting user 174. Furthermore, once a vehicle is selected to service a given transport request 171, the selection engine 130 can provide the selected vehicles location 136 (whether human-driver or AV) to the ETA calculator 150. The ETA calculator 150 may then filter out all other vehicles in order to provide ETA data 164 of the selected vehicle to the rider device 170.

According to examples described herein, the selection engine 130 can select AVs 182 according to a set of criteria not used for the selection of human driven vehicles 187. If this set of criteria is met for a given AV 189 and transport request 171, then the selection engine 130 can select the AV 189 to service the transport request 171. If the set of criteria is not met, and the selection engine 130 can revert back to selecting a human driven vehicle 187 to service the transport request 171. In some examples, the set of criteria corresponds to a minimum portion of the overall trip in which the selected AV 189 operates in autonomy mode. In other words, the selected AV 189 can be monitored by the human safety driver 183 that has the ability to switch the AV 189 from manual mode, in which the safety driver 183 manually controls the AV 189, to an autonomy mode in which the AV 189 operates autonomously along roads within the autonomy grid 142. The minimum portion can comprise a minimum distance percentage of the trip (e.g., 70% distance must be in autonomy mode), a minimum estimated time percentage of the trip (e.g., 70% of estimated time must be in autonomy mode), and/or a maximum threshold for extra driving in manual mode (e.g., 15% of distance or estimated time). Satisfaction of the set of criteria can be determined based on the most optimal route between the pickup location in the drop off location, or from the AV's 189 current location to the drop off location (including making the pick-up.

In certain implementations, the hybrid trip planning system 100 can route the AV 189 through the autonomy grid map 142 even when a full manual route may be more optimal in terms of distance and/or time. To ensure that the passenger is not unduly delayed, the set of criteria can include a maximum extra manual driving threshold, which can ensure that the AV 189 does not diverge from the actual optimal path by more than a threshold distance or estimated time. In one example, this threshold can correspond to 15% extra distance or time in comparison to the actual optimal path (e.g., a shortest path from the pick-up location and drop-off location). Accordingly, if the maximum extra manual driving threshold is not met, the selection engine 130 can revert to selecting a human-driven vehicle 187 that is not autonomy capable.

Thus, upon selecting an AV 189 to service a given transport request 171, the selection engine 130 can provide AV data 132 corresponding to the selected AV 189 to a location/route optimizer 120 of the hybrid trip planning system 100. The location/route optimizer 120 can analyze the selected AV data 132 in the context of the road network map 144 and the autonomy grid map 142 to determine a most optimal entry point into the autonomy grid map 142 from the pickup location indicated in the transport request 171. In determining the most optimal entry point, the location/route optimizer can determine a plurality of possible entry points from the pickup location, and converge on the most optimal entry point by performing a distance or time optimization from either (i) the pickup location to the autonomy grid map 142, or (ii) the overall route from the pickup location to the drop off location. In the latter case, the location/route optimizer 120 can first determine a most optimal overall route from the pickup location to the drop off location.

In certain implementations, location/route optimizer 120 can parse most optimal route into segments in which the selected AV 189 is to operate in manual mode and autonomy mode. In doing so, the location/route optimizer 120 can identify the most optimal entry point to the autonomy grid map 142, and in most optimal exit point from the autonomy grid map 142 (assuming both the pick-up location and the drop-off location are external to the autonomy grid map 142). If one or the other of the pickup location or drop off location is located within the autonomy grid map 142, then the location/route optimizer 120 can perform the optimization for the single entry or exit point with respect to the autonomy grid map 142. For the most optimal exit point, location/route optimizer 120 can also identify a plurality of potential exit point from the autonomy grid map 142 to the drop off location. The most optimal exit point can be determined based on the most optimal overall route, or a shortest distance or time between the autonomy grid map 142 and the drop off location.

In various examples, the location/route optimizer 120 can optimize the overall route between the pickup location to drop off location, or can segment the route into up to three separate optimizations. For example, location/route optimizer 120 can perform an initial route optimization between the pickup location and the determined entry point of the autonomy grid map 142. Additionally, the location/route optimizer 120 can perform an autonomy route optimization for the autonomy segment of the trip within the autonomy grid map 142, starting from the most optimal entry point and ending at most optimal exit point. Still further, the location/route optimizer 120 can perform a final route optimization between the most optimal exit point and the drop off location.

In segmenting the overall route in the above manner, location/route optimizer 120 can generate and provide the selected AV 189 with a set transport instructions 122 indicating each of the route segments. The transport instructions 122 can be executable by a control system of the AV 189 to provide route instructions on an interior display for the safety driver 183 to first manually operate the AV 189 to the pickup location and then to the most optimal entry point. Thereafter, the executing transport instructions 122 can cause an indication to be displayed instructing the safety driver 183 to switch the selected AV 189 to autonomy mode. The control system of the AV 189 made an autonomously operate the AV 189 along the autonomy route through the autonomy grid map 142 to the most optimal exit point. Thereafter, the executing transport instructions 122 can cause an indication be displayed instructing the safety driver 183 to switch the selected AV 189 back to the manual mode. The safety driver 183 may then manually operate the AV 189 in accordance with displayed route information to the drop off location.

In certain examples, the location/route optimizer 120 can determine both the most optimal entry point and the most optimal exit point with respect to the autonomy grid map 142. In generating the transport instructions 122, the location/route optimizer 120 can allow the selected AV 189 to utilize onboard route planning resources in order to determine its own path through the autonomy grid 142 from the entry point to the exit point. Furthermore, in determining the most optimal entry point and the most optimal exit point, the location/route optimizer 120 can narrow each set of potential entry points and exit points to locations that are after a respective intersection.

For example, the most optimal entry point can comprise a location that is after a first intersection within the autonomy grid map 142. Likewise, most optimal exit point can comprise a location that is after the last intersection within the autonomy grid map 142. Accordingly, both the most optimal entry point and most optimal exit point must be within the autonomy grid map 142, at which points the safety driver 183 switches the selected AV 189 between the manual mode and the autonomy mode respectively. Selecting entry and exit points after intersections has proven to be most advantageous in terms of safety and seamlessness of transitions. However, examples described herein recognize that the most optimal entry and exit points may also be selected before a given intersection, in the middle of a road segment, in a parking area, at a designated loading and unloading area, or other predetermined locations within the autonomy grid map 142.

As described herein, the hybrid trip planning system 100 can support both human driven routes, fully autonomous routes within the autonomy grid map 142, and hybrid routes in which the safety driver 183 of a given AV 189 operates the AV 189 in manual mode along a portion of the overall route. In addition to optimizing the entry and exit points with respect to the autonomy grid map 142, the location/route optimizer 120 can generate the set of transport instructions 122 to provide the human safety driver 183 with granular route instructions as well as timing instructions for switching the AV 189 between the manual mode and the autonomy mode. In some aspects, switching modes from manual mode to autonomy mode on the AV 189 may require the safety driver 183 to pull over and stop. Likewise, switching modes from autonomy mode to manual mode may require a control system of the AV 189 to park or stop. However, it is contemplated that upon arriving at the entry point of the autonomy grid map 142, the safety driver 183 can select the autonomy mode while the AV 189 is still in motion, and the control system of the AV 189 can seamlessly transition to the autonomy mode on the fly. It is also contemplated that switching from the autonomy mode to the manual mode can also be accomplished seamlessly while the AV 189 is still in motion.

Autonomous Vehicle

Figure 2:
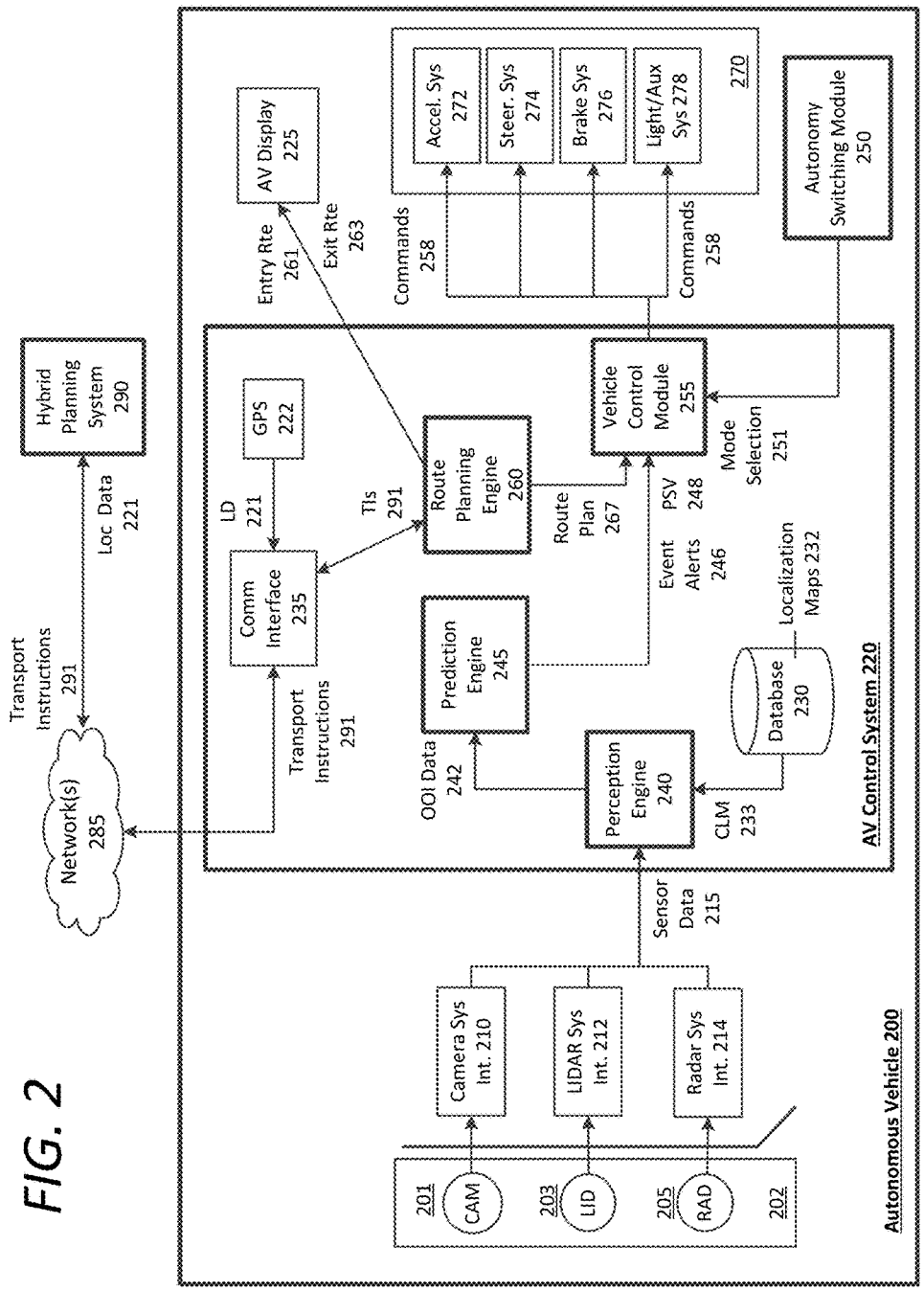
FIG. 2 is a block diagram illustrating an example autonomous vehicle in communication with a hybrid trip planning system, as described herein.

FIG. 2 is a block diagram illustrating an example AV operated by a control system implementing a teleassistance module, as described herein. In an example of FIG. 2, a control system 220 can autonomously operate the AV 200 in a given geographic region for a variety of purposes, including transport services (e.g., transport of humans, delivery services, etc.). In examples described, the AV 200 can operate without human control. For example, the AV 200 can autonomously steer, accelerate, shift, brake, and operate lighting components. Some variations also recognize that the AV 200 can switch between an autonomous mode, in which the AV control system 220 autonomously operates the AV 200, and a manual mode in which a driver takes over manual control of the acceleration system 272, steering system 274, braking system 276, and lighting and auxiliary systems 278 (e.g., directional signals and headlights).

According to some examples, the control system 220 can utilize specific sensor resources in order to autonomously operate the AV 200 in a variety of driving environments and conditions. For example, the control system 220 can operate the AV 200 by autonomously operating the steering, acceleration, and braking systems 272, 274, 276 of the AV 200 to a specified destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes computational resources (e.g., processing cores and/or field programmable gate arrays (FPGAs)) which operate to process sensor data 215 received from a sensor system 202 of the AV 200 that provides a sensor view of a road segment upon which the AV 200 operates. The sensor data 215 can be used to determine actions which are to be performed by the AV 200 in order for the AV 200 to continue on a route to the destination, or in accordance with a set of transport instructions 291 received from a hybrid planning system 290, such as the hybrid trip planning system 100 described with respect to FIG. 1. In some variations, the control system 220 can include other functionality, such as wireless communication capabilities using a communication interface 235, to send and/or receive wireless communications over one or more networks 285 with one or more remote sources. In controlling the AV 200, the control system 220 can generate commands 258 to control the various control mechanisms 270 of the AV 200, including the vehicle's acceleration system 272, steering system 257, braking system 276, and auxiliary systems 278 (e.g., lights and directional signals).

The AV 200 can be equipped with multiple types of sensors 202 which can combine to provide a computerized perception, or sensor view, of the space and the physical environment surrounding the AV 200. Likewise, the control system 220 can operate within the AV 200 to receive sensor data 215 from the sensor suite 202 and to control the various control mechanisms 270 in order to autonomously operate the AV 200. For example, the control system 220 can analyze the sensor data 215 to generate low level commands 258 executable by the acceleration system 272, steering system 257, and braking system 276 of the AV 200. Execution of the commands 258 by the control mechanisms 270 can result in throttle inputs, braking inputs, and steering inputs that collectively cause the AV 200 to operate along sequential road segments according to a route plan 267.

In more detail, the sensor suite 202 operates to collectively obtain a live sensor view for the AV 200 (e.g., in a forward operational direction, or providing a 360 degree sensor view), and to further obtain situational information proximate to the AV 200, including any potential hazards or obstacles. By way of example, the sensors 202 can include multiple sets of camera systems 201 (video cameras, stereoscopic cameras or depth perception cameras, long range monocular cameras), LIDAR systems 203, one or more radar systems 205, and various other sensor resources such as sonar, proximity sensors, infrared sensors, and the like. According to examples provided herein, the sensors 202 can be arranged or grouped in a sensor system or array (e.g., in a sensor pod mounted to the roof of the AV 200) comprising any number of LIDAR, radar, monocular camera, stereoscopic camera, sonar, infrared, or other active or passive sensor systems.

Each of the sensors 202 can communicate with the control system 220 utilizing a corresponding sensor interface 210, 212, 214. Each of the sensor interfaces 210, 212, 214 can include, for example, hardware and/or other logical components which are coupled or otherwise provided with the respective sensor. For example, the sensors 202 can include a video camera and/or stereoscopic camera system 201 which continually generates image data of the physical environment of the AV 200. The camera system 201 can provide the image data for the control system 220 via a camera system interface 210. Likewise, the LIDAR system 203 can provide LIDAR data to the control system 220 via a LIDAR system interface 212. Furthermore, as provided herein, radar data from the radar system 205 of the AV 200 can be provided to the control system 220 via a radar system interface 214. In some examples, the sensor interfaces 210, 212, 214 can include dedicated processing resources, such as provided with field programmable gate arrays (FPGAs) which can, for example, receive and/or preprocess raw image data from the camera sensor.

In general, the sensor systems 202 collectively provide sensor data 215 to a perception engine 240 of the control system 220. The perception engine 240 can access a database 230 comprising stored localization maps 232 of the given region in which the AV 200 operates. The localization maps 232 can comprise a series of road segment sub-maps corresponding to the autonomy grid 142 described with respect to FIG. 1. As provided herein, the localization maps 232 can comprise highly detailed ground truth data of each road segment of the given region. For example, the localization maps 232 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 200 travels along a given route, the perception engine 240 can access a current localization map 233 of a current road segment to compare the details of the current localization map 233 with the sensor data 215 in order to detect and classify any objects of interest, such as moving vehicles, pedestrians, bicyclists, and the like.

In various examples, the perception engine 240 can dynamically compare the live sensor data 215 from the AV's sensor systems 202 to the current localization map 233 as the AV 200 travels through a corresponding road segment. The perception engine 240 can flag or otherwise identify any objects of interest in the live sensor data 215 that can indicate a potential hazard. In accordance with many examples, the perception engine 240 can provide object of interest data 242 to a prediction engine 245 of the control system 220, wherein the objects of interest in the object of interest data 242 indicates each classified object that can comprise a potential hazard (e.g., a pedestrian, bicyclist, unknown objects, other vehicles, etc.).

Based on the classification of the objects in the object of interest data 242, the prediction engine 245 can predict a path of each object of interest and determine whether the AV control system 220 should respond or react accordingly. For example, the prediction engine 240 can dynamically calculate a collision probability for each object of interest, and generate event alerts 251 if the collision probability exceeds a certain threshold. As described herein, such event alerts 251 can be processed by the vehicle control module 255, along with a processed sensor view 248 indicating the classified objects within the live sensor view of the AV 200. The vehicle control module 255 can then generate control commands 258 executable by the various control mechanisms 270 of the AV 200, such as the AV's acceleration, steering, and braking systems 272, 274, 276.

On a higher level, the AV control system 220 can include a route planning engine 260 that provides the vehicle control module 255 with a route plan 267 to a given destination, such as a pick-up location, a drop off location, or an exit point within an autonomy grid map. In various aspects, the route planning engine 260 can generate the route plan 267 based on transport instructions 291 received from the hybrid trip planning system 290 over one or more networks 285. According to examples described herein, the AV 200 can include a location-based resource, such as a GPS module 222, that provide location data 221 (e.g., periodic location pings) to the hybrid trip planning system 290. Based on the AV's 200 location data 221, the hybrid trip planning system 290 may select the AV 200 to service a particular transport request, as described above with respect to FIG. 1.

In various examples, when the AV 200 is selected to serve as a transport request, the hybrid planning system 290 can transmit said transport instructions 291 to the communication interface to 235 over the one or more networks 285. As described herein, the transport instructions 291 can include routing instructions for the human safety driver to manually operate the AV 200 off grid (i.e., outside the autonomy grid map). Specifically, the transport instructions 291 can be processed by the route planning engine 260 to generate, on an AV display screen 225 of the AV 200, and entry route 261 that provides the safety driver with route instructions from the pickup location to most optimal entry point to the autonomy grid map. Transport instructions 291 can also include autonomy route planning information that the route planning engine 260 can process to generate an updated route plan 267 for the vehicle control module 255 once the AV 200 is within the autonomy grid map and can utilize the stored localization maps 232. Accordingly, transport instructions 291 can provide the route planning engine 260 with an overall route at least from given pickup location to a drop off location for requesting user. In some aspects, the transport instructions 291 can also provide route data from the AV's 200 current location to the pickup location.

The entry route 261 can be displayed on the AV display 225 is live route data enabling the safety driver to manually drive the AV 200 to the pickup location to rendezvous with a requesting user, and from the pickup location to the most optimal entry point as indicated in the transport instructions 291. At the most optimal entry point, the AV display 225 can provide an indication to the safety driver to switch the AV 202 autonomy mode. The safety driver can do so by providing input on an autonomy switching module 250, which can comprise one or more switches, buttons, display features, and the like. The input on the autonomy switching module 250, can indicate a mode selection 251 to the vehicle control module 255, which can cause the vehicle control module 255 to take control of the vehicle's control mechanisms 270.

Thereafter, the vehicle control module 255 can execute the updated route plan 267 that takes the AV 200 from the most optimal entry point into the autonomy grid to the most optimal exit point of the autonomy grid. Upon reaching the exit point, the AV display 225 can display an indication to the safety driver to switch the AV 200 back to the manual mode. Accordingly, the safety driver can provide another input to the autonomy switching module 250 which can generate a mode selection 251 instructed the vehicle control module 255 autonomous control of the control mechanisms 270. As such, the AV display 225, executing transport instructions 291, can display an exit route 263 from most optimal exit point to the drop off location. The safety driver can follow this live exit route 263 in manually operating AV 200 to drop off the requesting user at the drop off location.

Examples described herein recognize that the pickup location or the drop off location may be located within the autonomy grid map and thus either the respective entry route 261 or exit route 263 may not be necessary for completion of a transport request. Furthermore, the transport instructions 291 may indicate to the route planning engine 260 the most optimal entry point and exit point, and the route planning engine 260 can generate the route plan 267 within the autonomy grid map independently. Still further, the safety driver may on occasion stray from the entry route 261 or the exit route 263, which can trigger a certain action by the hybrid planning system 290. For example, the hybrid planning system 290 can continue monitoring the location data 221 of the AV 200. If the location data 221 indicates that the AV 200 has strayed from the entry route 261 or the exit route 263, the hybrid planning system 290 can be triggered to update the entry route 261 or the exit route 263.

In certain examples, if the entry route 261 is updated, the hybrid planning system 290 may determine that a new or alternative entry point to the autonomy grid map is more optimal than the original. Accordingly, the safety driver's divergence from the entry route 261 can trigger multiple updates to the overall trip for the requesting user. Specifically, a new entry point can trigger the hybrid planning system 290 to recalculate a new autonomy route for the AV 200 within the autonomy grid map. Additionally or alternatively, the new entry point can trigger the hybrid planning system 290 to determine a new exit point from the autonomy grid map, and thus can also update the exit route 263 from the new exit point to the drop off location. Accordingly, a divergence from the entry route 261 or the safety driver's independent selection of a new entry point into the autonomy grid map can trigger the hybrid planning system 290 to recalculate or optimize an updated autonomy route, an updated exit point, and/or an updated exit route 263.

In some aspects, certain functions of the hybrid trip planning system 290 described herein may be performed on-board by the AV control system 220. For example, the transport instructions 291 may simply include a pick-up location and a drop-off location for a requesting user, and the route planning engine 260 can perform the entry point, exit point, and route optimizations described herein. Specifically, the functions of the location/route optimizer 120 described in connection with the hybrid trip planning system 100 of FIG. 1 may be performed by the route planning engine 260 as shown in FIG. 2. Furthermore, in determining the most optimal entry and exit points, the route planning engine 260 can utilize a stored autonomy grid map, a road network map, a live traffic map, and/or the localization maps 232, and can utilize the same to perform a number of route optimizations for the overall trip. In addition, the route planning engine 260 can monitor route progress when the AV 200 is in manual mode, and generate a user interface for the safety driver on the AV display 225 indicating the entry and exit points, the entry route 261 and the exit route 263, and driver prompts to indicate to the driver when the switch the AV 200 to autonomy mode and back to manual mode.

Hybrid Trip Planning

Figure 3:
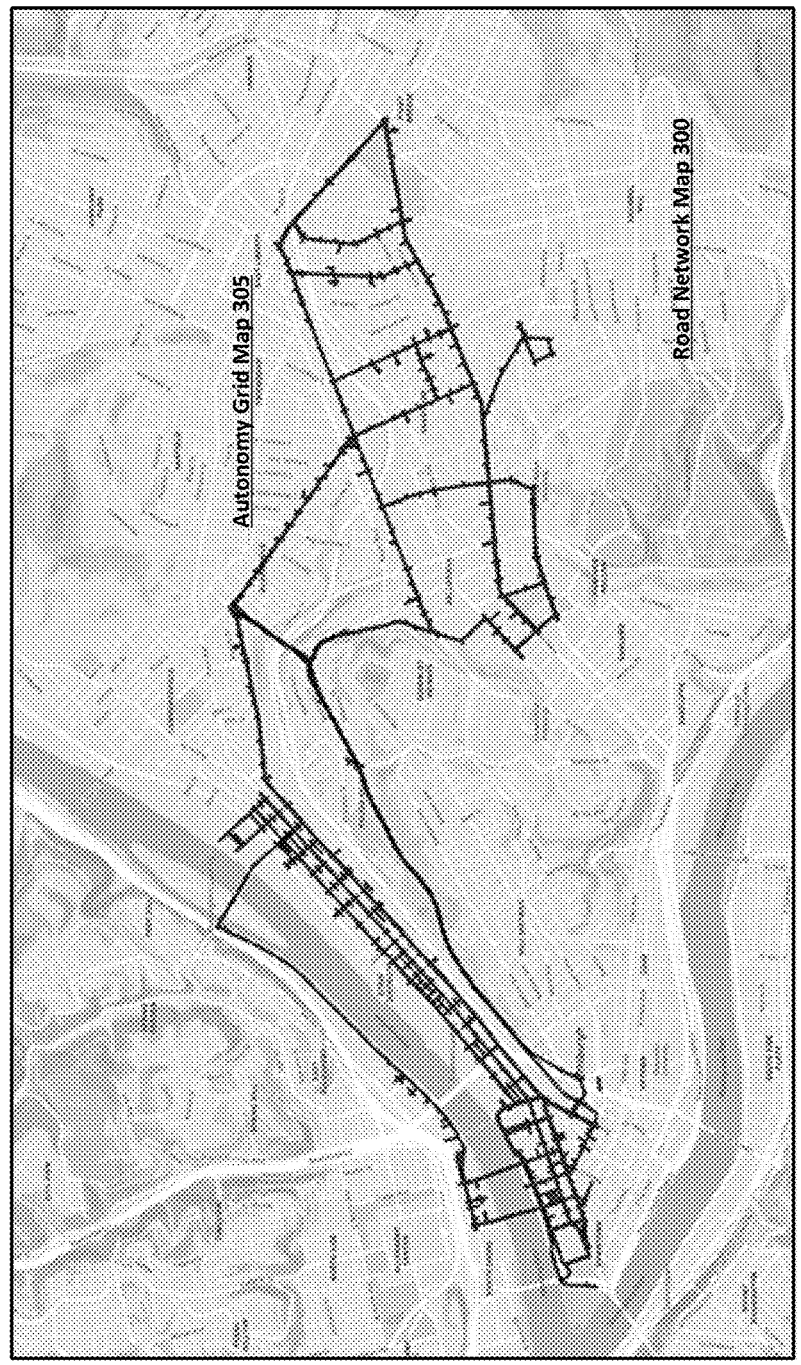
FIG. 3 shows an example of an autonomy map overlaid on a road network map, according to various examples.

FIG. 3 shows an example of an autonomy map overlaid on a road network map, according to various examples. The road network map 300 can indicate all roads in a given region, whereas the autonomy grid map 305 (in bold) can indicate the streets and intersections that have been fully mapped and labeled for AV operation. The road network map 300 and autonomy grid map 305 shown in FIG. 3 can represent the autonomy grid map 142 and road network map 144 utilized by the hybrid trip planning system 100 as shown and described with respect to FIG. 1.

Figure 4A:
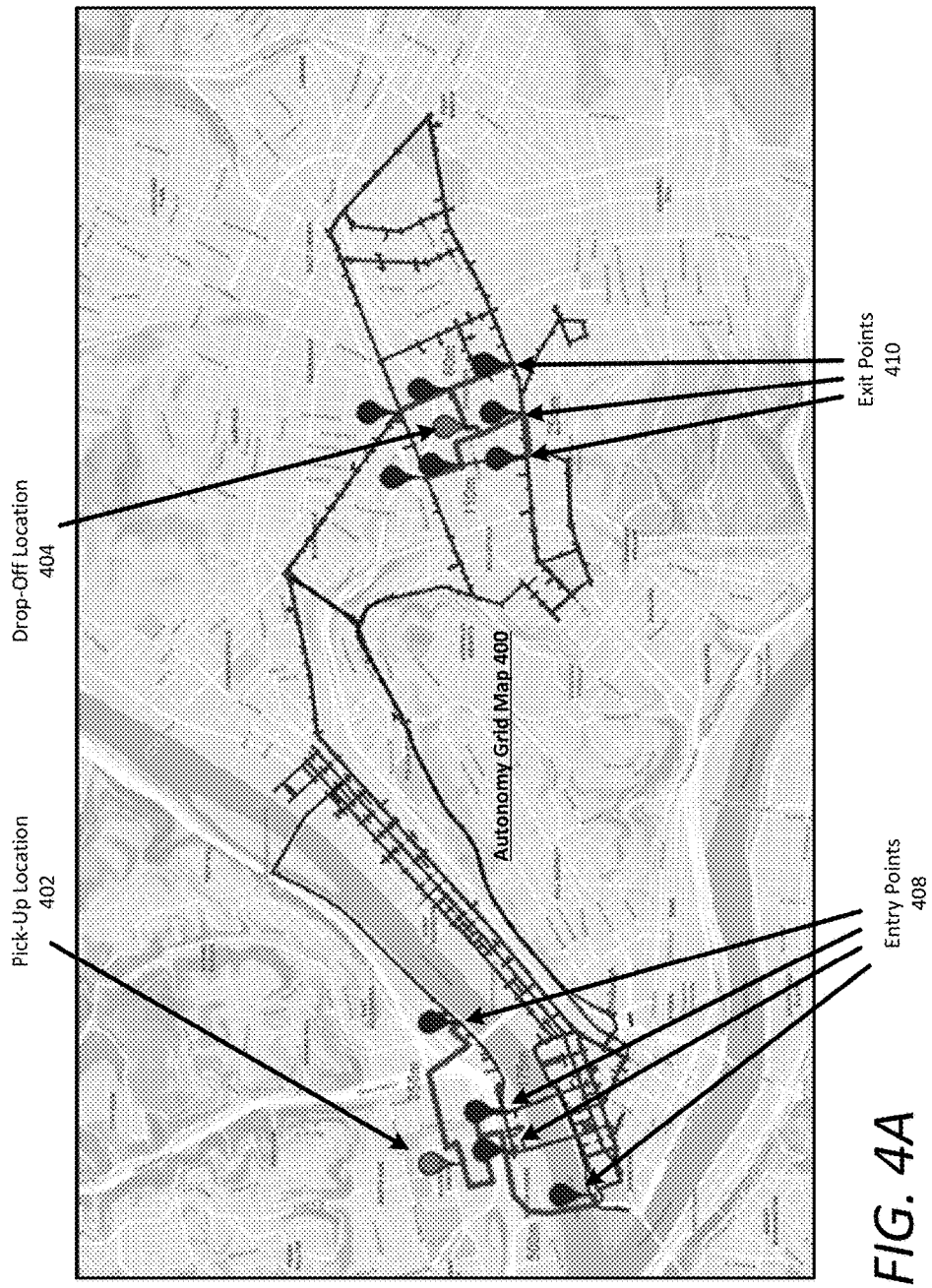
FIGS. 4A and 4B illustrate an example autonomy map entry and exit optimization for use in hybrid trip planning, according to various examples.
Figure 4B:
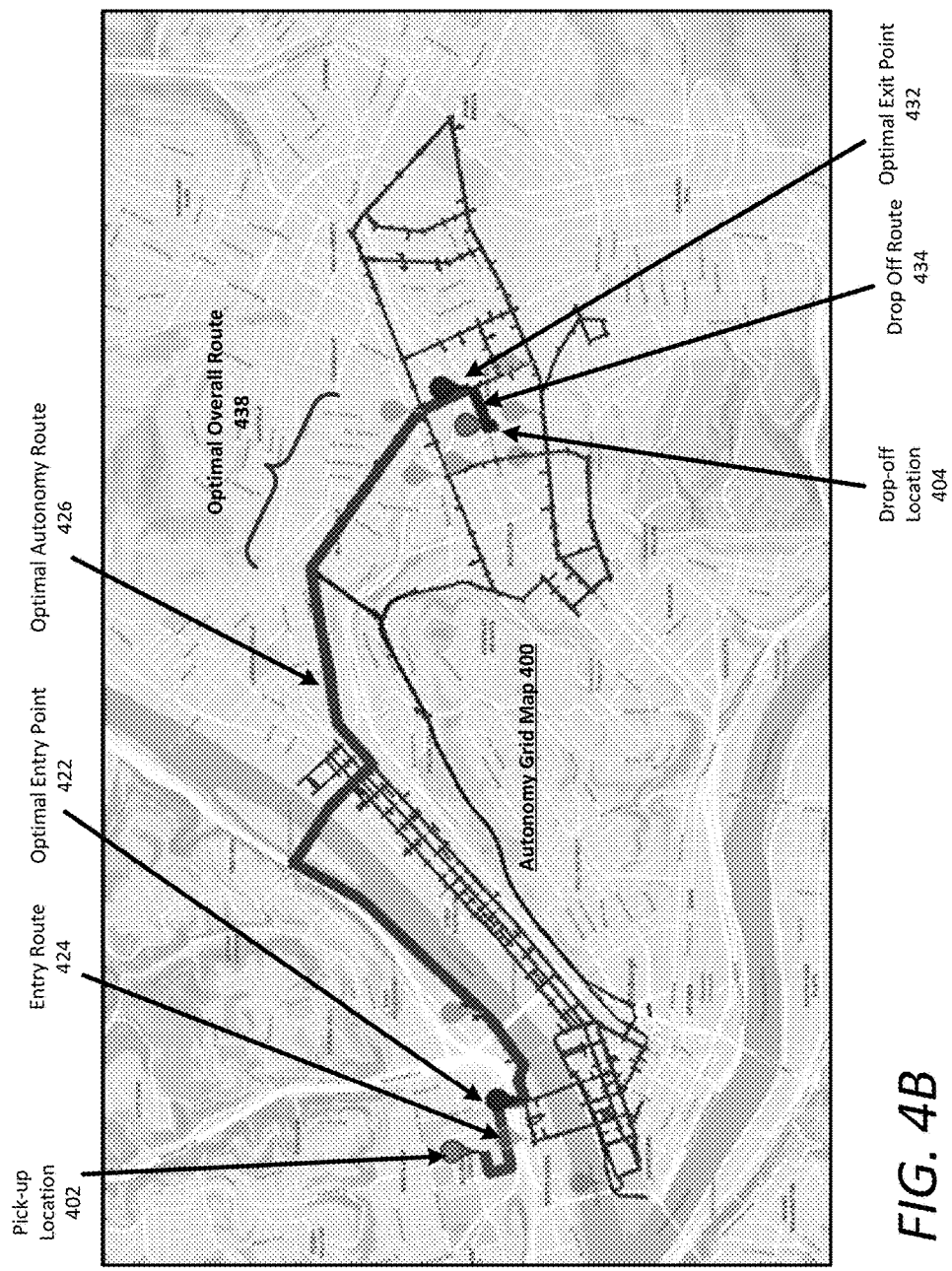

FIGS. 4A and 4B illustrate an example autonomy map entry and exit optimization for use in hybrid trip planning, according to various examples. As shown in FIG. 4A, a transport request can be received by the hybrid trip planning system 100, and can include a pick-up location 402 and a drop off location 404. In the example of FIG. 4A, both the pick-up location 402 and the drop off location 404 are off the autonomy grid 400, and therefore require hybrid trip planning system 100 to determine whether the trip between the pick-up location 402 and the drop off location 404 is qualified for AV servicing (e.g., based on a minimum autonomous control threshold and a maximum extra manual control threshold, either by distance or time for the total trip).

Assuming that the trip does qualify for AV servicing, the hybrid trip planning system 100 can select an AV to service the trip, and then determine a set of possible entry points 408 and a set of possible exit points 410 to and from the autonomy grid 400 respectively. Referring to FIG. 4B, the hybrid trip planning system 100 can determine a most optimal entry point 422 from the set of possible entry points shown in FIG. 4A. The hybrid trip planning system 100 can also determine a most optimal exit point 432 from the set of possible exit points 410 shown in FIG. 4A. In determining the optimal entry point 422 and the optimal exit point 432, the hybrid trip planning system 100 can respective distance or time optimizations for the entry route 424 between the pick-up location 402 and the autonomy grid map 400, and for the drop off route 434 between the autonomy grid map 400 and the drop off location 404. These optimizations can ensure that the distance or time that the AV is under manual control is minimized.

In variations, the hybrid trip planning system 100 can first determine the most optimal overall route 438 in terms of distance or time (e.g., using a road network map or a live traffic map respectively). Based on the optimal overall route 438, the hybrid trip planning system 100 can determine the optimal entry point 422 and the optimal exit point 432 accordingly. It is to be noted that the optimal entry point 422 and the optimal exit point 432 are not merely junctures between the autonomy grid 400 and non-autonomy portions of the road map. Rather, the most optimal entry and exit points 422, 432 correspond to locations at which the safety driver of the AV is to switch the AV from manual mode to autonomy mode and vice versa. In various examples, the hybrid trip planning system 100 can set such transition locations after a corresponding intersection in which the AV enters the autonomy grid 400 and the last intersection prior to the AV exiting the autonomy grid 400. Thus, such transition locations can correspond directly to the optimal entry and exit points 422, 432.

In certain variations, the hybrid trip planning system 100 can separately calculate or otherwise parse the optimal overall route 438 into segments corresponding to the entry route 424 from the pick-up location 402 to the entry point 422, the optimal autonomy route 426 from the entry point 422 to the exit point 432, and the drop off route 434 from the exit point 432 to the drop-off location 404. In doing so, the hybrid trip planning system 100 can generate a set of transport instructions executable by the AV to display route data for the entry route 424 and drop off route 434 for the safety driver to follow during manual operation, and route data for the optimal autonomy route 426 executable by the AV's control system in autonomy mode.

Accordingly, upon picking up the requesting user at the pick-up location 402, the human safety driver can manually drive the AV along the entry route 424 to the optimal entry point 422, and can then be prompted (e.g., via a display prompt on the interior display of the AV) to switch the AV into autonomy mode. The AV's control system can then autonomously drive the AV along the optimal autonomy route 426 to the optimal exit point 432, at which point the safety driver can be prompted to switch the AV back to manual control, and can then manually drive the AV along the drop off route 434 to the drop off location 404.

Figure 4C:
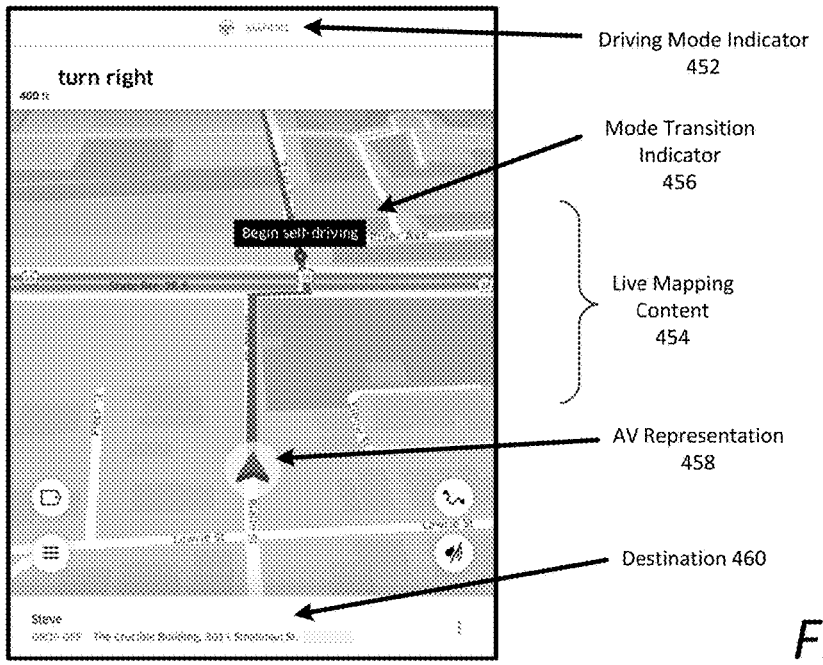
FIGS. 4C and 4D depict example user interfaces providing mode transition prompts for a safety driver of an autonomous vehicle.
Figure 4D:
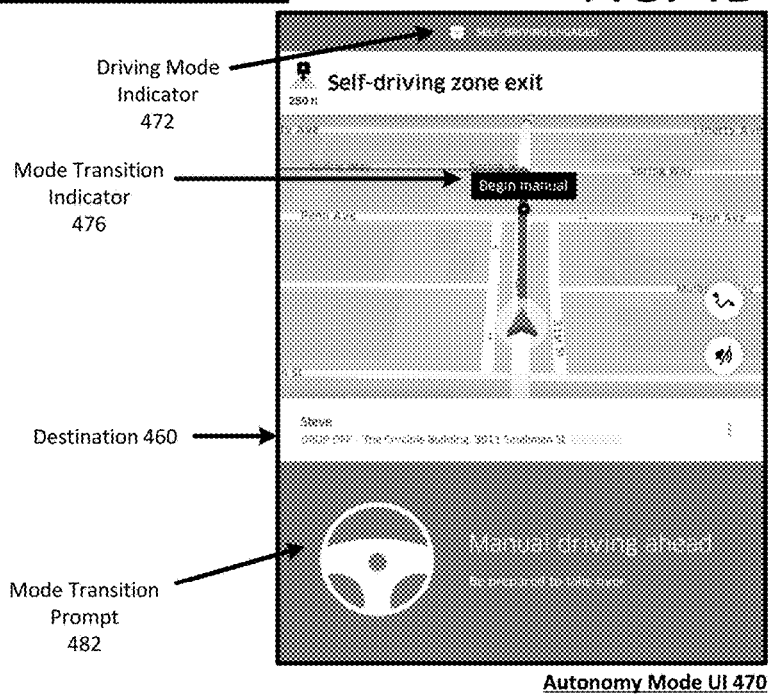

FIGS. 4C and 4D depict example user interfaces providing mode transition prompts for a safety driver of an AV. The respective user interfaces can be generated on a display screen within the interior cabin of the AV (e.g., AV display 225 shown in FIG. 2), such as on the dashboard, a head-up display area, a computing device of the driver (e.g., a smartphone or tablet computer), or the center console of the AV. Referring to FIG. 4C, the display screen can generate a manual mode user interface 450 when the safety driver is in control of the AV. For example, the manual driving mode of the AV can be indicated by a driving mode indicator 452 on the manual mode user interface 450. In the example shown in FIG. 4C, the safety driver has picked up a passenger and is manually driving the AV to an entry point to the autonomy grid map, which is indicated by the mode transition indicator 456. The mode transition indicator 456 signifies a precise location at which the safety driver is to switch the AV from manual driving mode to autonomous or self-driving mode.

The manual mode user interface 450 can further display live mapping content 454 that provide real-time directions along the entry route to the mode transition location (i.e., the entry point). The manual mode interface 450 can further include an AV representation 458 indicating the current location of the AV as the safety driver operates the AV towards the mode transition location. Once the AV arrives at the mode transition indicator 456, the safety driver can switch the AV to full autonomous mode, enabling the control system of the AV to take over vehicle operations. Accordingly, the AV can autonomously driver through its autonomous route segment within the autonomy grid map towards the exit point to the destination 460.

Referring to FIG. 4D, the autonomy mode user interface 470 can be displayed when the AV is operating in autonomous or self-driving mode. Accordingly, the driving mode indicator 472 can indicate that the AV is currently operating in self-driving mode through the autonomy grid map towards the exit point, signified by the mode transition indicator 476. The mode transition indicator 476 of FIG. 4D can correspond to the exit point from the autonomy grid map, and can indicate the location at which the safety driver is to switch the AV back to manual drive mode. When the AV reaches within a predetermined distance or time from the mode transition location represented by the mode transition indicator 476, the autonomy mode user interface 470 can prominently display a mode transition prompt 482 to notify the safety driver. Once the AV arrives at the mode transition location, the safety driver can switch the AV back to manual drive mode and manually operate the AV along the indicated route to the destination 460.

Methodology

Figure 5:
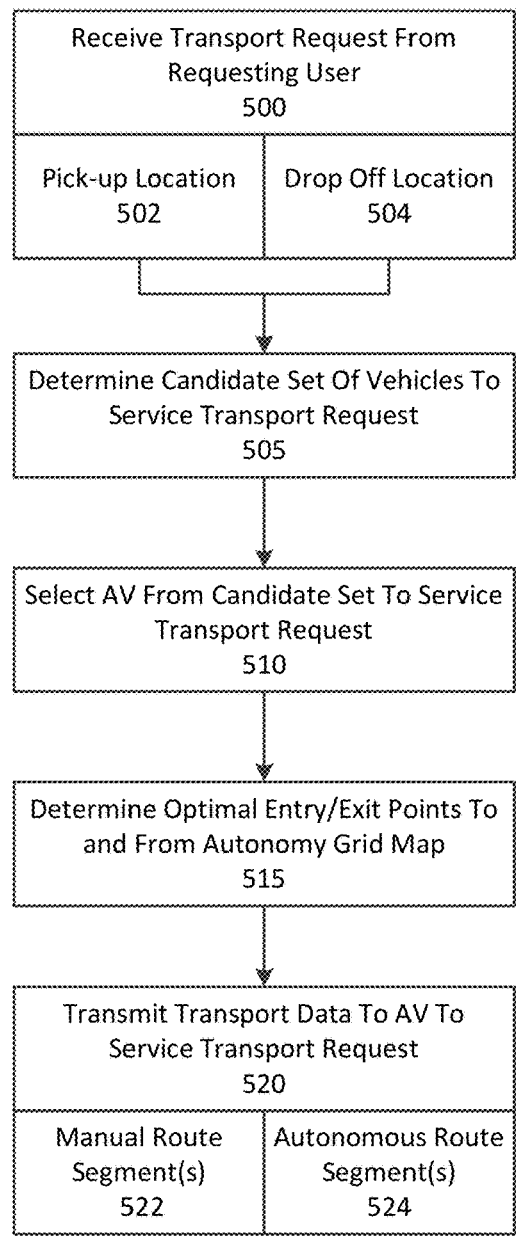
FIG. 5 is a flow chart describing an example method of hybrid trip planning for autonomous vehicles, according to examples described herein.

FIG. 5 is a flow chart describing an example method of hybrid trip planning for autonomous vehicles, according to examples described herein. In the below discussion FIG. 5, reference may be made to reference characters representing like features as shown and described with respect to FIGS. 1 and 2. Furthermore, the steps and processes described respect FIG. 5 may be performed by an example hybrid trip planning system 100 as shown and described with respect to FIG. 1. Referring to FIG. 5, the hybrid trip planning system 100 can receive the transport request 171 from a requesting user 174 (500). In various implementations, the transport request 171 can include a pickup location (502) and a drop off location (504). Based on the transport request 171, the hybrid trip planning system 100 can determine a candidate set of vehicles to service transport request 171 (505). In certain aspects, this candidate set of vehicles can comprise only AVs, only human driven vehicles, or a combination of AVs and human driven vehicles.

The hybrid trip planning system 100 may then select an AV 189 from the candidate set to service the transport request 171 (510). Based on the pickup location and drop off location, the hybrid trip planning system 100 can determine optimal entry and exit points to and from the autonomy grid map 142 (515). Hybrid trip planning system 100 may then transmit transport data 122 to the selected AV 189 to enable a combination of the AV safety driver in the autonomous control system 220 of the AV 189 to execute an overall route plan in order to service the transport request 171 (520). Transport data 122 can be divided between manual route segments (522) and autonomous route segments as described herein (524).

Figure 6:
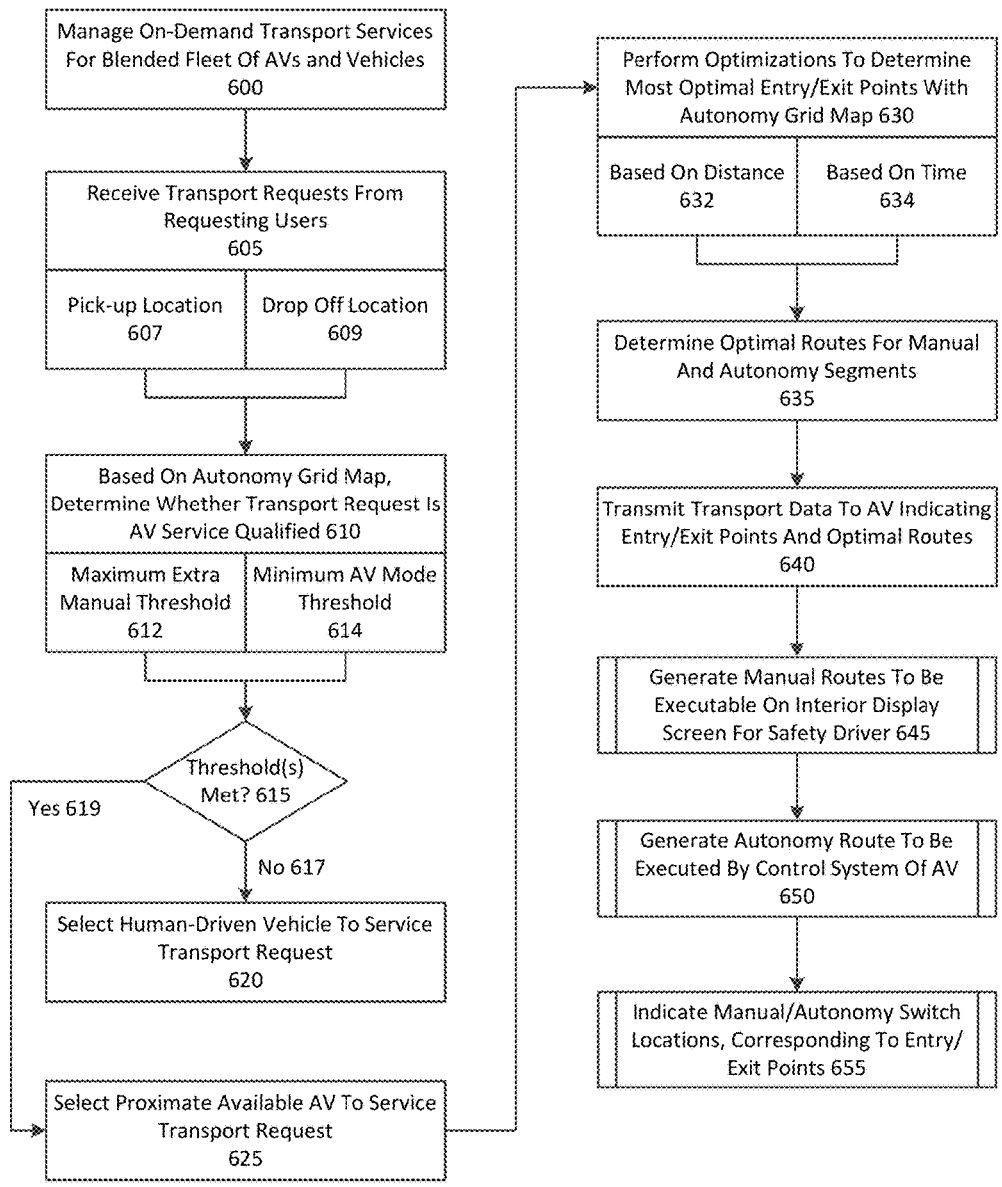
FIG. 6 is flow chart describing another example method of hybrid trip planning for autonomous vehicles, according to examples described herein.

FIG. 6 is flow chart describing a lower level example method of hybrid trip planning for autonomous vehicles, according to examples described herein. Below description of FIG. 6, reference may also be made to reference characters representing like features as shown and described with respect to FIGS. 1 and 2. Furthermore, the below processes described with respect to FIG. 6 may also be performed by an example hybrid trip planning system 100 as shown and described with respect to FIG. 1. Referring to FIG. 6, hybrid trip planning system 100 can manage on-demand transport services for blended fleet of AVs 182 and human driven vehicles 187 (600). In doing so, hybrid trip planning system 100 can receive transport requests 171 from requesting users 174 (605). Each transport request 171 can include a pickup location (607) and a drop off location (609).

Based on autonomy grid map 142, the hybrid trip planning system can determine whether the transport request 171 is AV service qualified, or whether the transport request 171 satisfies a set of criteria corresponding to AV transport services (610). For example, hybrid trip planning system 100 can determine whether the overall trip corresponding to the transport request 171 does not exceed a maximum extra manual driving threshold (612). Additionally or alternatively, the hybrid trip planning system 100 can determine whether the overall trip corresponding to the transport request meets a minimum AV mode threshold (614). Thus, hybrid trip planning system 100 can determine whether the thresholds are met (615). If not (617), then the hybrid trip planning system 100 can select a human driven vehicle (e.g., a closest available vehicle) to service the transport request 171 (620). However, if so (619), and the hybrid trip planning system 100 can select a proximate available AV to service the transport request 100 (625).

It is contemplated that the set of criteria corresponding to AV transport services can act as a filter for the transport requests 171. As such, if the criteria are met, then the hybrid trip planning system 100 can either select only from a group of candidate AVs, or select from a blend of human driven vehicles and AVs. In either case, hybrid trip planning system 100 can select a most optimal vehicle (e.g., a closest vehicle in terms of distance or time). For example, the hybrid trip planning system 100 can select a closest vehicle using a road network map, or a vehicle having a shortest ETA to the pickup location using a live traffic map.

In various examples, the hybrid trip planning system 100 can perform optimizations determine most optimal entry and exit points with respect to the autonomy grid map 142 (630). These most optimal entry and exit points can be determined based on distance (632) or time (634) (e.g., from the pick-up location to the entry point, and from the exit point to the drop off location). In variations, most optimal entry and exit points can be determined based on an overall route optimization between the pickup location and drop off location, as described herein. The hybrid trip planning system 100 can further determine optimal routes for manual and autonomy segments (635). Hybrid trip planning system 100 may then generate and transmit transport data 122 to the AV 189 that indicates the most optimal entry and exit points as well as the optimal routes (640). Accordingly the transport data 122 can include the manual routes as well as the autonomy route.

In generating the transport data 122, the hybrid trip planning system 100 can generate the manual routes to be executable on an interior display screen of the AV 189 for the safety driver (645). The hybrid trip planning system 100 can also generate the autonomy route to be executed by a control system 220 of the AV 189 (650). Still further, the transport data 122 can further provide prompts for the safety driver indicating the manual to autonomy and autonomy to manual transition locations corresponding to the entry and exit points (655).

As described herein, one or more steps described with respect to the flow charts of FIGS. 5 and 6 may be performed by the control system 220 of the AV 200. For example, the AV control system 220 can perform optimizations to determine most optimal entry/exit points with autonomy grid map (630), and can further determine the optimal routes for both the manual and autonomy segments of the trip (635).

Hardware Diagrams

Figure 7:
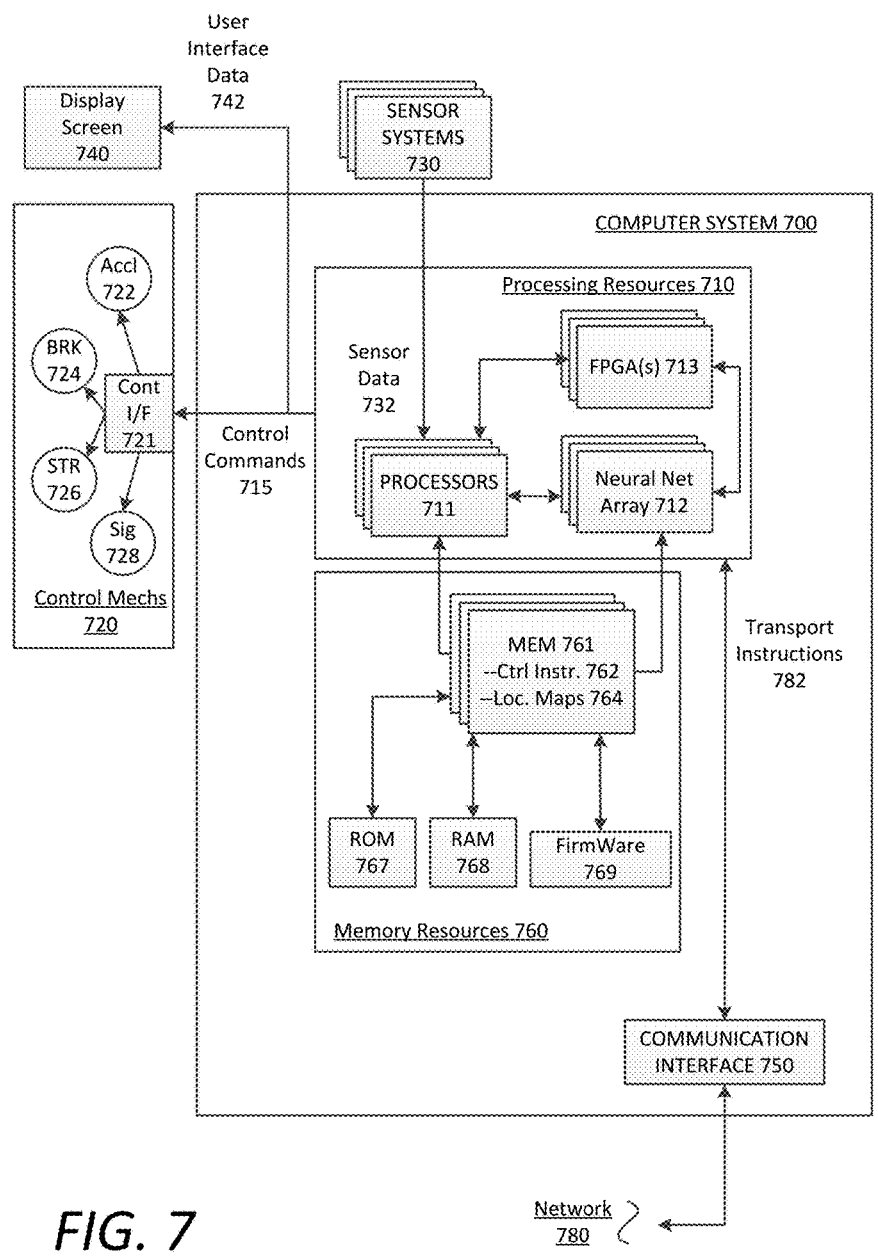
FIG. 7 is a block diagram illustrating a computer system for an autonomous vehicle upon which examples described herein may be implemented.

FIG. 7 is a block diagram illustrating a computer system upon which example AV processing systems described herein may be implemented. The computer system 700 can be implemented using a number of processing resources 710, which can comprise processors 711, field programmable gate arrays (FPGAs) 713. In some aspects, any number of processors 711 and/or FPGAs 713 of the computer system 700 can be utilized as components of a neural network array 712 implementing a machine learning model and utilizing road network maps stored in memory 761 of the computer system 700. In the context of FIGS. 1 and 2, various aspects and components of the AV control system 220 can be implemented using one or more components of the computer system 700 shown in FIG. 7.

According to some examples, the computer system 700 may be implemented within an autonomous vehicle (AV) with software and hardware resources such as described with examples of FIG. 2. In an example shown, the computer system 700 can be distributed spatially into various regions of the AV, with various aspects integrated with other components of the AV itself. For example, the processing resources 710 and/or memory resources 760 can be provided in a cargo space of the AV. The various processing resources 710 of the computer system 700 can also execute control instructions 762 using microprocessors 711, FPGAs 713, a neural network array 712, or any combination of the same.

In an example of FIG. 7, the computer system 700 can include a communication interface 750 that can enable communications over a network 780. In one implementation, the communication interface 750 can also provide a data bus or other local links to electro-mechanical interfaces of the vehicle, such as wireless or wired links to and from control mechanisms 720 (e.g., via a control interface 721), sensor systems 730, and can further provide a network link to a backend transport management system or a remote teleassistance system (implemented on one or more datacenters) over one or more networks 780.

The memory resources 760 can include, for example, main memory 761, a read-only memory (ROM) 767, storage device, and cache resources. The main memory 761 of memory resources 760 can include random access memory (RAM) 768 or other dynamic storage device, for storing information and instructions which are executable by the processing resources 710 of the computer system 700. The processing resources 710 can execute instructions for processing information stored with the main memory 761 of the memory resources 760. The main memory 761 can also store temporary variables or other intermediate information which can be used during execution of instructions by the processing resources 710. The memory resources 760 can also include ROM 767 or other static storage device for storing static information and instructions for the processing resources 710. The memory resources 760 can also include other forms of memory devices and components, such as a magnetic disk or optical disk, for purpose of storing information and instructions for use by the processing resources 710. The computer system 700 can further be implemented using any combination of volatile and/or non-volatile memory, such as flash memory, PROM, EPROM, EEPROM (e.g., storing firmware 769), DRAM, cache resources, hard disk drives, and/or solid state drives.

The memory 761 may also store localization maps 764 in which the processing resources 710—executing the control instructions 762—continuously compare to sensor data 732 from the various sensor systems 730 of the AV. Execution of the control instructions 762 can cause the processing resources 710 to generate control commands 715 in order to autonomously operate the AV's acceleration 722, braking 724, steering 726, and signaling systems 728 (collectively, the control mechanisms 720). Thus, in executing the control instructions 762, the processing resources 710 can receive sensor data 732 from the sensor systems 730, dynamically compare the sensor data 732 to a current localization map 764, and generate control commands 715 for operative control over the acceleration, steering, and braking of the AV along a particular route plan based on transport instructions 782 received from a hybrid trip planning system over the network 780. The processing resources 710 may then transmit the control commands 715 to one or more control interfaces 721 of the control mechanisms 720 to autonomously operate the AV along an autonomy route indicated in the transport instructions 782, as described throughout the present disclosure.

Furthermore, the transport instructions 782 can be processed by the processing resources 710 to generate user interface data on an interior display screen 740 of the AV. The user interface data 742 can include live route data for a human safety driver to follow while operating the AV in manual mode, as well as prompts to switch the AV between manual mode and autonomy mode.

Figure 8:
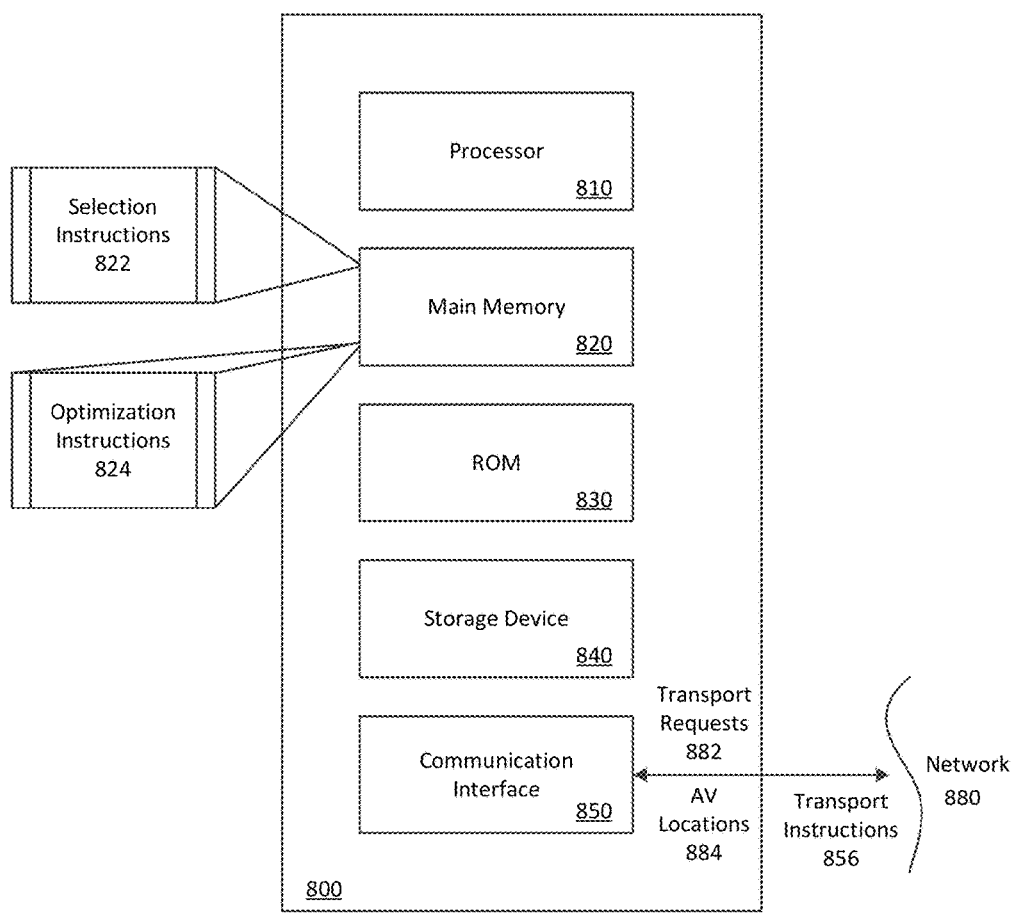
FIG. 8 is a block diagram illustrating a computer system for a backend datacenter upon which example transport systems described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service for providing transportation services. In the context of FIGS. 1 and 2, the hybrid trip planning system 100, 290 may be implemented using a computer system 800 such as described by FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate over one or more networks 880 (e.g., cellular network) through use of the network link (wireless or wired). Using the network link, the computer system 800 can communicate with one or more computing devices, one or more servers, and/or one or more autonomous vehicles. The executable instructions stored in the memory 820 can include selection instructions 822, which enables the computer system 800 to receive AV locations 884 of AVs operating throughout the given region, and select a particular AV to service a transport request 882 received from a requesting user. The executable instructions can further include optimization instructions 824, which enables the computer system 800 to process the transport requests 882 to identify pick-up locations and drop off locations, determine optimal entry and exit points with respect to an autonomy grid, and perform route optimizations for manual and autonomy route segments for the resultant trip. The computer system 800 may execute the optimization instructions 824 to generate a set of transport instructions 856 indicating the trip characteristics, and transmit the transport instructions 856 to the selected AV.

The processor 810 is configured with software and/or other logic to perform one or more processes, steps and other functions described with implementations, such as described with respect to FIGS. 1-6, and elsewhere in the present application. Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A hybrid trip planning system comprising:
one or more processors; and
one or more memory resources storing instructions that, when executed by the one or more processors, cause the one or more processors to:
receive a transport request from a requesting user;
determine a pick-up location from the transport request;
select an autonomous vehicle (AV) to service the transport request;
identify a plurality of entry points from the pick-up location to an autonomy grid on which AVs operate;
determine a most optimal entry point from the plurality of entry points; and
transmit transport data to the selected AV, the transport data providing a first optimal route for a human safety driver to drive the selected AV in a manual mode from the pick-up location to the most optimal entry point, at which the selected AV switches into an autonomous driving mode.

2. The hybrid trip planning system of claim 1, wherein the executed instructions further cause the one or more processors to:
based on receiving the transport request, identify a set of candidate AVs within a predetermined proximity of the pick-up location;
wherein the executed instructions cause the one or more processors to select the AV to service the transport request from the set of candidate AVs.

3. The hybrid trip planning system of claim 1, wherein the transport data is executable by the selected AV to cause mapping and routing information to be generated on an interior user interface of the selected AV, the mapping and routing information providing the human safety driver with the first optimal route from the pick-up location to the most optimal entry point.

4. The hybrid trip planning system of claim 1, wherein the executed instructions further cause the one or more processors to:
  determine a drop-off location from the transport request;
  determine a plurality of exit points from the autonomy grid to the drop-off location; and
  determine a most optimal exit point from the plurality of exit points.

5. The hybrid trip planning system of claim 4, wherein the transport data further provides a second optimal route for the human safety driver to drive the selected AV from the most optimal exit point, at which the human safety driver is to switch the AV to the manual mode to manually drive the AV to the drop-off location.

6. The hybrid trip planning system of claim 5, wherein the transport data is executable by the selected AV to cause mapping and routing information to be generated on an interior user interface of the selected AV, the mapping and routing information providing the human safety driver with the second optimal route from the most optimal exit point to the drop-off location.

7. The hybrid trip planning system of claim 5, wherein the executed instructions cause the one or more processors to determine the most optimal entry point and the most optimal exit point based on distance optimizations using a road network map.

8. The hybrid trip planning system of claim 5, wherein the executed instructions cause the one or more processors to determine the most optimal entry point and the most optimal exit point based on time optimizations using a live traffic map.

9. The hybrid trip planning system of claim 5, wherein the executed instructions further cause the one or more processors to:
  perform a first optimization to determine an autonomy route for the AV through the autonomy grid from the most optimal entry point to the most optimal exit point; and
  transmit route data to the selected AV, the route data being executable by a control system of the selected AV, the route data indicating the optimized autonomy route from the most optimal entry point to the most optimal exit point.

10. The hybrid trip planning system of claim 9, wherein the executed instructions further cause the one or more processors to:
  detect a trigger corresponding to the human safety driver entering the autonomy grid at an alternate entry point that is different from the most optimal entry point; and
  in response to the trigger, perform a second optimization to determine a new autonomy route from the alternate entry point to the most optimal exit point; and
  transmit route data indicating the new autonomy route to the selected AV for execution.

11. The hybrid trip planning system of claim 4, wherein the executed instructions cause the one or more processors to establish each of the most optimal entry and exit points after a respective intersection to facilitate safe transitions between the manual mode and the autonomy mode.

12. The hybrid trip planning system of claim 1, wherein the executed instructions further cause the one or more processors to:
  based on the pick-up location, determine a set of candidate vehicles to service the transport request, the set of candidate vehicle comprising a blend of non-autonomous vehicles and AVs;
  wherein the executed instructions cause the one or more processors to select the selected AV to service the transport request based on the pick-up location and a drop-off location identified in the transport request fulfilling a set of criteria which enable availability of autonomous transport services.

13. The hybrid trip planning system of claim 12, wherein the set of criteria includes an autonomy distance threshold comprising a minimum distance percentage in which the selected AV must be in the autonomous mode between the pick-up location and the drop off location.

14. The hybrid trip planning system of claim 12, wherein the set of criteria includes an autonomy time threshold comprising a minimum time percentage in which the selected AV must be in the autonomous mode between the pick-up location and the drop off location.

15. The hybrid trip planning system of claim 12, wherein the set of criteria includes a manual distance threshold comprising a maximum distance percentage in which the selected AV can operate in the manual mode between the pick-up location and the drop off location.

16. The hybrid trip planning system of claim 12, wherein the set of criteria includes a manual time threshold comprising a maximum time percentage in which the selected AV can operate in the manual mode between the pick-up location and the drop off location.

17. A computer-implemented method of hybrid trip planning, the method being performed by one or more processors and comprising:
  receiving a transport request from a requesting user;
  determining a pick-up location from the transport request;
  selecting an autonomous vehicle (AV) to service the transport request;
  identifying a plurality of entry points from the pick-up location to an autonomy grid on which AVs operate;
  determining a most optimal entry point from the plurality of entry points; and
  transmitting transport data to the selected AV, the transport data providing a first optimal route for a human safety driver to drive the selected AV in a manual mode from the pick-up location to the most optimal entry point, at which the selected AV switches into an autonomous driving mode.

18. The method of claim 17, further comprising:
  based on receiving the transport request, identifying a set of candidate AVs within a predetermined proximity of the pick-up location;
  wherein the one or more processors select the AV to service the transport request from the set of candidate AVs.

19. A non-transitory computer readable medium storing instructions that, when executed by one or more processors, cause the one or more processors to:
  receive a transport request from a requesting user;
  determine a pick-up location from the transport request;
  select an autonomous vehicle (AV) to service the transport request;
  identify a plurality of entry points from the pick-up location to an autonomy grid on which AVs operate;
  determine a most optimal entry point from the plurality of entry points; and
  transmit transport data to the selected AV, the transport data providing a first optimal route for a human safety driver to drive the selected AV in a manual mode from the pick-up location to the most optimal entry point, at which the selected AV switches into an autonomous driving mode.

20. The non-transitory computer readable medium of claim 19, wherein the executed instructions further cause the one or more processors to:
   based on receiving the transport request, identify a set of candidate AVs within a predetermined proximity of the pick-up location;
   wherein the executed instructions cause the one or more processors to select the AV to service the transport request from the set of candidate AVs.

* * * * *